(12) United States Patent
Qiu et al.

(10) Patent No.: US 11,257,650 B2
(45) Date of Patent: Feb. 22, 2022

(54) THREE PHASE SURGE PROTECTION DEVICE

(71) Applicant: TDK Electronics AG, Munich (DE)

(72) Inventors: Hua Qiu, Zhuhai (CN); Xiaojia Tian, Zhuhai (CN); Zhouquan He, Zhuhai (CN); Wen Yang, Zhuhai (CN)

(73) Assignee: TDK ELECTRONICS AG, Munich (DE)

( * ) Notice: Subject to any disclaimer, the term of this patent is extended or adjusted under 35 U.S.C. 154(b) by 0 days.

(21) Appl. No.: 16/982,121

(22) PCT Filed: Apr. 2, 2019

(86) PCT No.: PCT/EP2019/058294
§ 371 (c)(1),
(2) Date: Sep. 18, 2020

(87) PCT Pub. No.: WO2019/193005
PCT Pub. Date: Oct. 10, 2019

(65) Prior Publication Data
US 2021/0104372 A1  Apr. 8, 2021

(30) Foreign Application Priority Data
Apr. 4, 2018  (CN) .......................... 201810299060.6

(51) Int. Cl.
*H01H 85/02* (2006.01)
*H01C 7/12* (2006.01)
(Continued)

(52) U.S. Cl.
CPC .......... *H01H 85/0241* (2013.01); *H01C 7/12* (2013.01); *H01H 85/0052* (2013.01); *H01H 85/12* (2013.01); *H01H 85/306* (2013.01); *H01H 85/36* (2013.01); *H02H 3/025* (2013.01); *H02H 3/04* (2013.01); *H02H 3/05* (2013.01); *H02H 3/22* (2013.01); *H01H 85/06* (2013.01); *H01H 85/175* (2013.01); *H01H 85/2015* (2013.01)

(58) Field of Classification Search
CPC .......... H01H 85/0241; H01H 85/0052; H01H 85/12; H01H 85/306; H01H 85/36; H02H 3/025; H02H 3/04
See application file for complete search history.

(56) References Cited

U.S. PATENT DOCUMENTS 9,093,203 B2   7/2015  Depping et al.
10,629,399 B2  4/2020  Li et al.
(Continued)

FOREIGN PATENT DOCUMENTS

CN   101361145 A   2/2009
CN   102598182 A   7/2012
(Continued)

*Primary Examiner* — Adolf D Berhane
*Assistant Examiner* — Afework S Demisse
(74) *Attorney, Agent, or Firm* — Slater Matsil, LLP

(57) ABSTRACT

A three phase surge protection device is disclosed. In an embodiment a device include a stack comprising a first varistor, a second varistor and a third varistor, wherein the varistors are electrically connected to form a circuit and a first thermal disconnect configured to interrupt the circuit when a temperature of the first thermal disconnect exceeds a predefined temperature.

12 Claims, 7 Drawing Sheets

(51) Int. Cl.
    *H01H 85/00*     (2006.01)
    *H01H 85/12*     (2006.01)
    *H01H 85/30*     (2006.01)
    *H01H 85/36*     (2006.01)
    *H02H 3/02*     (2006.01)
    *H02H 3/04*     (2006.01)
    *H02H 3/05*     (2006.01)
    *H02H 3/22*     (2006.01)
    *H01H 85/06*     (2006.01)
    *H01H 85/175*     (2006.01)
    *H01H 85/20*     (2006.01)

(56) References Cited

U.S. PATENT DOCUMENTS

| | | |
|---|---|---|
| 2006/0145807 A1 | 7/2006 | Gautier |
| 2007/0259548 A1* | 11/2007 | Byrne ................ H01R 13/6666 439/215 |
| 2014/0092514 A1 | 4/2014 | Chen |
| 2015/0171622 A1 | 6/2015 | Lee et al. |
| 2017/0047180 A1 | 2/2017 | Wang et al. |
| 2019/0295792 A1* | 9/2019 | Li ........................... H01C 7/12 |

FOREIGN PATENT DOCUMENTS

| | | |
|---|---|---|
| DE | 102006037551 A1 | 8/2007 |
| DE | 102016015593 A1 | 12/2017 |
| FR | 2848353 B1 | 6/2004 |
| WO | 2007093572 A1 | 8/2007 |

* cited by examiner

THREE PHASE SURGE PROTECTION DEVICE

This patent application is a national phase filing under section 371 of PCT/EP2019/058294, filed Apr. 2, 2019, which claims the priority of Chinese patent application 201810299060.6, filed Apr. 4, 2018, each of which is incorporated herein by reference in its entirety.

TECHNICAL FIELD

The present invention concerns a three phase surge protection device.

BACKGROUND

The device is configured to provide protection against electrical power disturbances to electrical equipment or installations such as electrical appliances and distribution circuits or networks. A disturbance may, for example, result from a surge, e.g., due to lightning.

A standard metal oxide varistor may catch fire under abnormal overvoltage conditions. A surge protection device can help to open a circuit before elements of the circuit catch fire. Moreover, the surge protection device can give alarm to keep failure-safe.

Overvoltage protection devices are known from each of U.S. Patent Application No. 2006/0145807 A1, DE Patent Application No. 10 2006 037551 A1 and DE Patent Application No. 10 2009 053145 A1. Each of these devices comprises only one varistor. In order to enable a three phase surge protection, it would be necessary to interconnect multiple devices. This would require a lot of space.

SUMMARY

Embodiments provide an improved surge protection device.

A three phase surge protection device is provided which comprises a stack comprising a first varistor, a second varistor and a third varistor wherein the varistors are electrically connected to form a circuit. The device further comprises a first thermal disconnect which is configured to interrupt the circuit if a temperature of the thermal disconnect exceeds a predefined temperature.

Thereby, the device can provide protection of an electrical equipment which is connected to the device against voltage surges. Thus, damage to the electrical equipment can be prevented.

As the device comprises three varistors, it can be operated as a three phase surge protection device which is configured to detect phase loss conditions and other three phase failures. As the varistors are stacked on each other to form a stack, hardly any additional space is required for the three varistors compared to a device comprising only one varistor. Thus, the device does not require a lot of space. This is particularly relevant in view of the ongoing trend towards miniaturization of components.

Each of the first to third varistor may be a metal oxide varistor (MOV). MOVs are non-linear, electronic devices made of ceramic-like materials comprising zinc-oxide grains and a complex amorphous inner granular material. Over a wide range of current, the voltage remains within a narrow band commonly called the varistor voltage. A log-log plot of the instantaneous voltage in volts versus the instantaneous current in amps yields a nearly horizontal line. It is this unique current-voltage characteristic that makes MOVs ideal devices for protection of sensitive electronic circuits against electrical surges, over-voltages, faults or shorts. When exposed to voltages exceeding their voltage value, MOVs become highly conductive devices that absorb and dissipate the energy related to the overvoltage and simultaneously limit dump current to a neutral line or ground plane. If an over-voltage condition is not discontinued, the MOVs will continue to overheat and can ultimately fail catastrophically, i.e., rupture or explode. Such catastrophic failure may destroy the sensitive electronic equipment and components in the vicinity of the MOVs. The first thermal disconnect may ensure that the circuit is interrupted before any one of the varistors is overheated to such an extent that it fails.

As the three varistors are combined into a stack, the device can be a module which requires less space than three discrete surge protection components. Accordingly, the device fulfills increasing requirements concerning miniaturization.

The three phase surge protection device can be configured to be electrically connected electronic equipment. In this case, the electronic equipment can be connected to the circuit. When the circuit is interrupted, a voltage may no longer be applied to the electronic equipment. Accordingly, the thermal disconnects can ensure that no overvoltage is applied to the electronic equipment.

The first thermal disconnect may comprise a first spring member wherein the first spring member is soldered to a first terminal of the stack by a low temperature solder joint.

The term "low temperature solder" may refer to a solder which has a melting point that is lower than the melting point of any other solder used for the assembly process of the device. In particular, the melting point of the low temperature solder may be lower than 200° C., preferably in a range from 100° C. to 200° C. The low temperature solder may comprise a metal alloy or a polymer having a low softening temperature. Specifically, the low temperature solder material is preferably a solid at room temperature (25° C.), and is a solid at least up to temperatures around 85° C. Preferably low temperature solder material has a melting temperature between 100° C. and 200° C., e.g., 138° C.

The first spring member may be deformed and tensed when it is soldered to a first terminal of the stack. Thus, the first spring member may be adapted and arranged such that the first spring member immediately releases its tension when the low temperature solder joint melts and, thereby, moves away from the first terminal.

The first thermal disconnect may be configured to interrupt the circuit when the low temperature solder joint melts. Thus, the low temperature solder joint may define a predetermined breaking point wherein the low temperature solder joint is configured to be opened due to overvoltage conditions before any other element of the device or any electronic equipment interconnected with the device is damaged. In particular, in this manner the electronic equipment interconnected with the device can be protected effectively.

The predefined temperature may be a melting temperature of a low temperature solder.

The first thermal disconnect may comprise a first slider, wherein the first thermal disconnect is configured such that the first slider triggers a micro switch when the low temperature solder joint between the first spring member and the first terminal of the stack melts due to an overheating of at least one of the first varistor and the third varistor.

The first slider may, in particular, be adapted and arranged to slide into an opening which opens between the first spring member and the corresponding terminal when the low temperature solder joint melts. Thereby, the first slider can quench any possible light arcs between the first terminal and the first spring member.

The micro switch may be configured to indicate an interruption of the circuit. Thereby, the micro switch can warn a user of an abnormal overvoltage condition. The micro switch can also indicate that the three phase surge protection device has to be replaced after an abnormal overvoltage condition has occurred.

The first thermal disconnect may be configured such that the first slider abuts the first spring member when the first spring member is fixed to the terminal of the first varistor by the low temperature solder joint. Accordingly, when the low temperature solder joint is closed, the first slider may not apply pressure to the solder joint. Thus, the first slider may not contribute to an aging of the solder joint. Instead of abutting the solder joint, the first slider may abut the first abutment face of the first spring member.

The first thermal disconnect may further comprise a first spring which is biased when the low temperature solder joint is closed and which is configured to move the first slider when the low temperature solder joint melts.

The device may further comprise a second thermal disconnect which is configured to interrupt the circuit if a temperature of the second thermal disconnect exceeds a predefined temperature. The second thermal disconnect may have a structure that is identical to the structure of the first thermal disconnect. As the device may comprise two thermal disconnects, an overvoltage protection can be ensured even in case of a failure of one of the thermal disconnects.

The first thermal disconnect and the second thermal disconnect may be independent from each other. In particular, each of the thermal disconnects is configured to interrupt the circuit irrespective of the behaviour of the respective other thermal disconnect. Accordingly, the reliability and the security of the device are very good as it comprises two independent elements which are both configured to interrupt the circuit in case of overvoltage conditions.

The second thermal disconnect may comprises a second spring member wherein the second spring member is soldered to a second terminal of the stack by a low temperature solder joint. The low temperature solder used for this solder joint may be identical to the low temperature solder used for the solder joint between the first spring member and the first terminal.

The second thermal disconnect may comprise a second slider, wherein the second thermal disconnect is configured such that the second slider triggers the micro switch when the low temperature solder joint between the second spring member and the second terminal of the stack melts due to an overheating of at least one of the second varistor and the third varistor.

The three phase surge protection device may further comprise a module housing, wherein the stack, the first thermal disconnect and the second thermal disconnect are arranged inside the module housing.

The first terminal of the stack may be connected to the first varistor and to the third varistor. The second terminal of the stack may be connected to the second varistor and to the third varistor. The stack may have a third terminal connected to the first varistor and to the second varistor. The first terminal of the stack may be connected to one end of the first spring member by a low temperature solder joint and the opposing end of the first spring member may form a first male connector of the device. The second terminal of the stack may be connected to one end of a second spring member by a low temperature solder joint and the opposing end of the second spring member may form a second male connector of the device. The third terminal may form a third male connector of the device.

BRIEF DESCRIPTION OF THE DRAWINGS

In the following, a preferred embodiment of the present invention is described with respect to the Figures.

DETAILED DESCRIPTION OF ILLUSTRATIVE EMBODIMENTS

Figure 1:
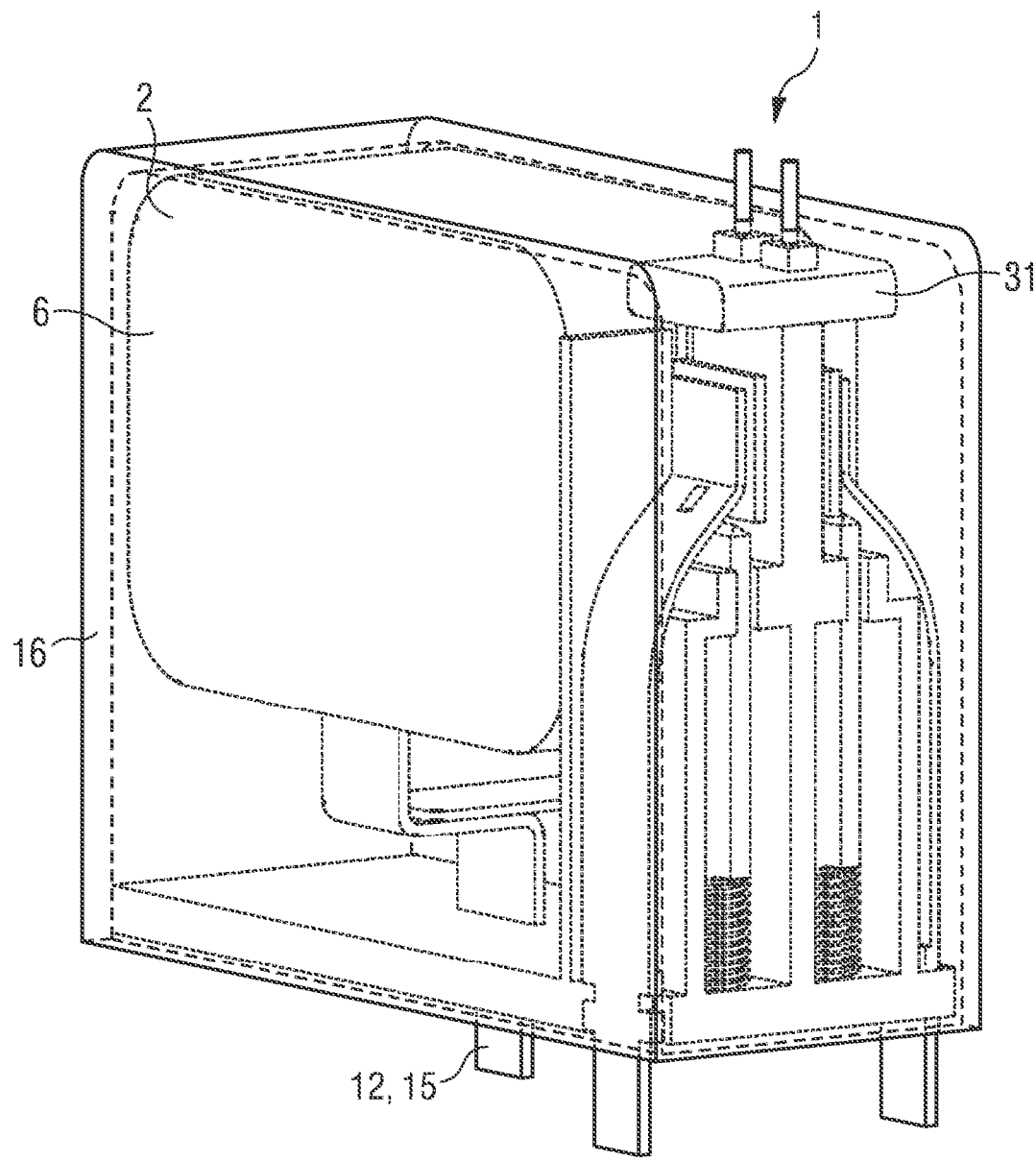
FIG. 1 shows a three phase surge protection device in a perspective view.

FIG. 1 shows a three phase surge protection device 1 in a perspective view.

Under phase loss conditions, a motor or an electrical equipment can draw excessive current on the two remaining phases which quickly overheats the motor or the electrical equipment. The three phase surge protection device 1 is configured to protect an electronic equipment or a motor that is connected to the three phase surge protection device 1 against damage caused by phase loss as well as damage caused by other three phase fault conditions. The three phase surge protection device 1 is configured to notify any fault conditions and to provide control contacts to turn off the electric equipment before damage occurs. The three phase surge protection device 1 is configured to provide a rapid interruption of a circuit.

The device 1 comprises a stack 2 which comprises a first varistor 3, a second varistor 4 and a third varistor 5. A varistor is a component whose impedance or resistance varies as a function of the voltage applied to the varistor. The use of such components in an application to provide protection against surges is well-known to the person skilled in the art and is therefore not explained in greater detail herein. The stack 2 is covered by a coating 6, such that the first varistor 3, the second varistor 4 and the third varistor 5 are not visible in FIG. 1.

Figure 2:
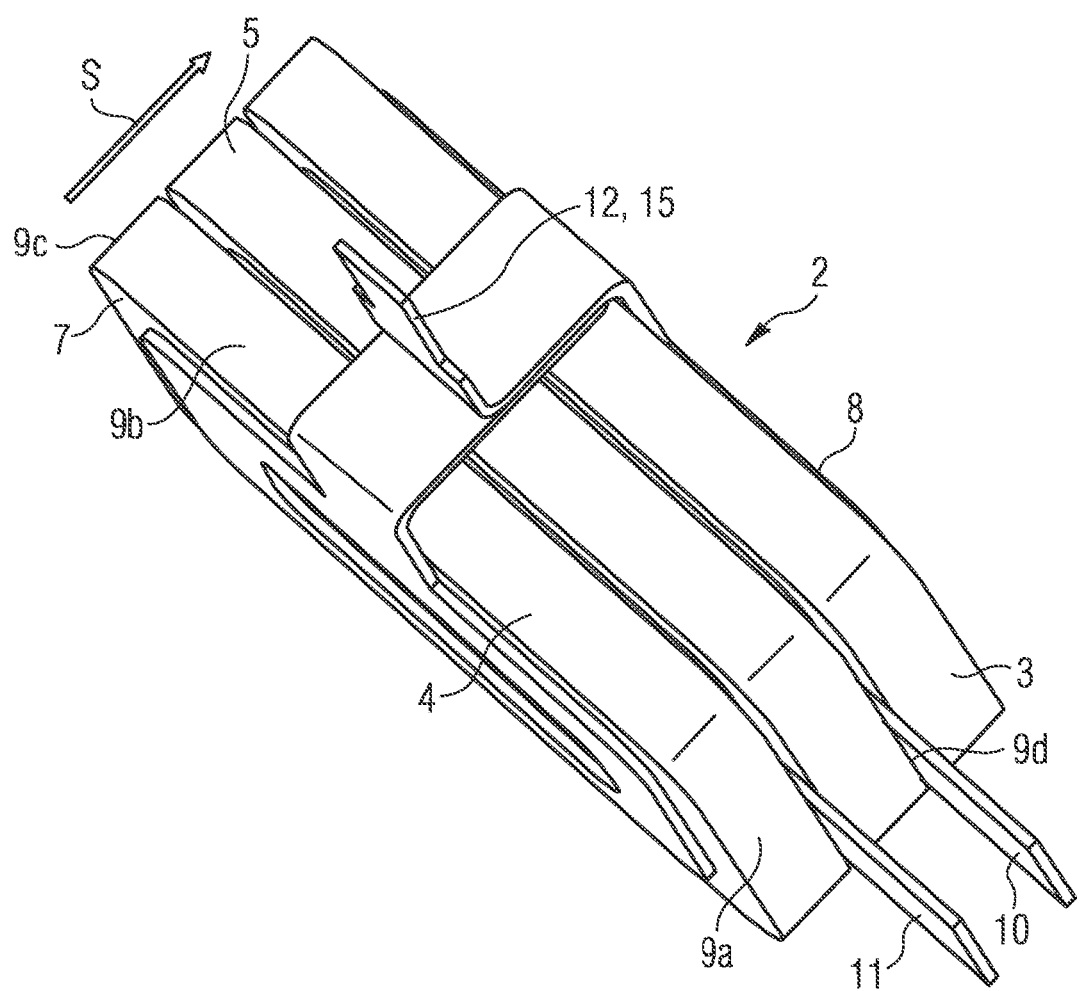
FIG. 2 shows a perspective view of a stack comprising three varistors.

FIG. 2 shows a perspective view of the stack 2 without the coating 6. The varistors 3, 4, 5 are stacked on top of each other. The stack 2 has a bottom face 7 and a top face 8 which is opposite to the bottom face 7. A stacking direction S can be defined by a surface normal of the bottom face 7 pointing towards the top face 8. In the stacking direction S, the third varistor 5 is arranged directly above the second varistor 4. In the stacking direction S, the first varistor 3 is arranged directly above the third varistor 5. In the stacking direction S, the third varistor 5 is sandwiched between the first varistor 3 and the second varistor 4. Further, the stack 2 comprises lateral faces 9*a*, 9*b*, 9*c*, 9*d* which are perpendicular to the bottom face 7 and the top face 8.

The stack 2 further comprises a first terminal 10, a second terminal 11 and a third terminal 12. The first terminal 10 and the second terminal 11 are arranged at a lateral face 9*a* of the stack 2. The first terminal 10 and the second terminal 11 are parallel to each other. The first terminal 10 is electrically connected to the first varistor 3 and to the third varistor 5. The second terminal 11 is electrically connected to the second varistor 4 and to the third varistor 5.

Moreover, the third terminal 12 is arranged at another lateral face 9*b* of the stack 2 which is perpendicular to the lateral face 9*a* at which the first terminal 10 and the second terminal 11 are arranged. Accordingly, the third terminal 12 is also perpendicular to the first terminal 10 and the second terminal 11. The third terminal 12 is connected to the first varistor 3 and to the second varistor 4 by a U-shaped bracket.

The three phase surge protection device 1 is configured to be inserted into a circuit board. In particular, the device comprises three male connectors 13, 14, 15 which can be plugged into respective female connectors of the circuit board. The third male connector 15 of the device 1 is formed by the third terminal 12 of the stack 2.

Figure 3:
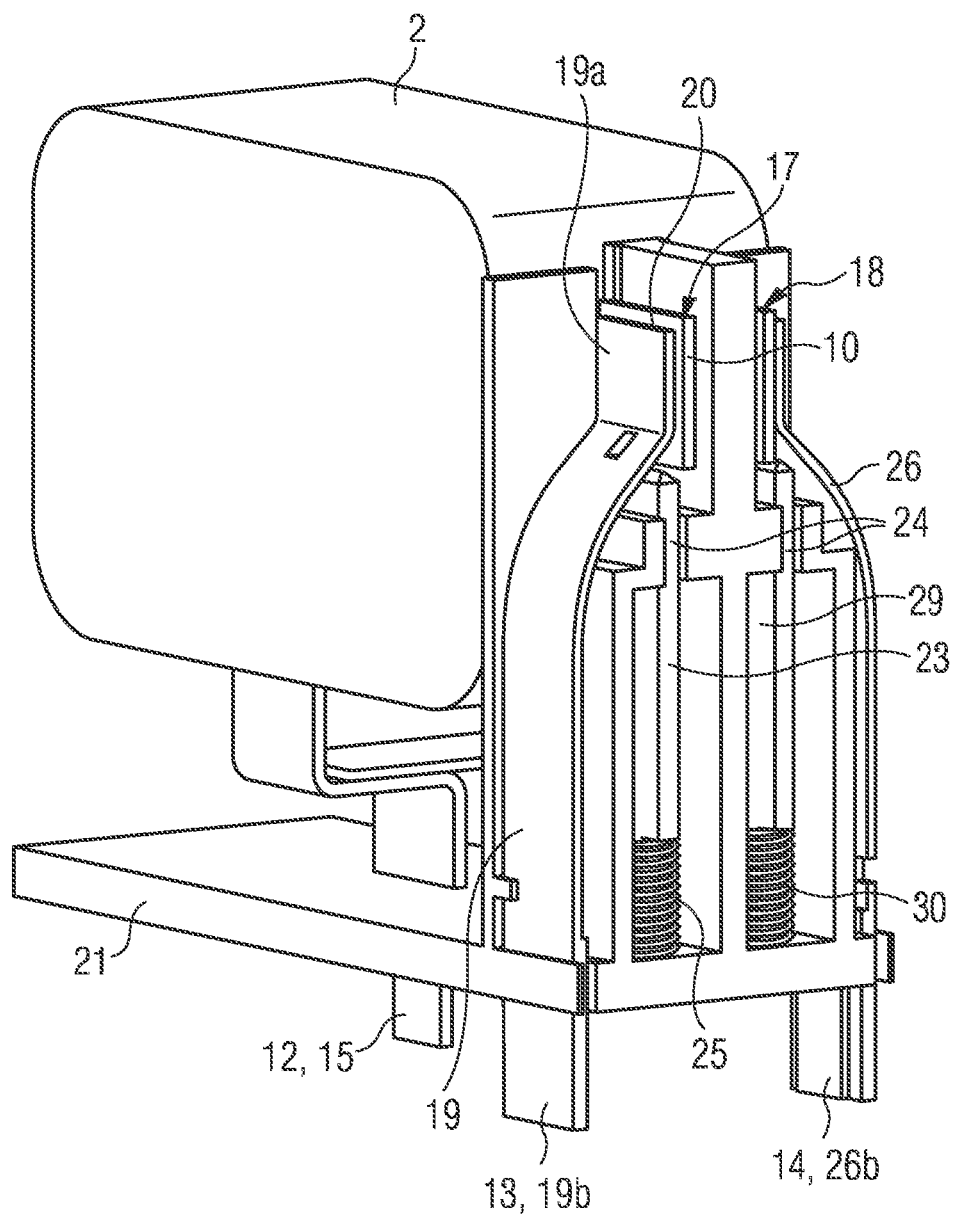
FIG. 3 shows the three phase surge protection device shown in FIG. 1 without a housing to improve the visibility of components inside the housing.

The three phase surge protection device 1 comprises a housing 16. FIG. 3 shows the three phase surge protection device 1 without the housing 16 to improve the visibility of the components inside the housing 16.

The three phase surge protection device 1 comprises a first thermal disconnect 17. The first thermal disconnect 17 is configured to interrupt the circuit defined through the device 1 if the first varistor 3 and/or the third varistor 5 is overheated. Thereby, the first thermal disconnect 17 can ensure that an overheating of the stack 2 can be prevented and, thus, an electrical equipment or a motor that is connected to the device 1 can be protected against overheating and damage.

The three phase surge protection device 1 comprises an operation state and a fault state. In the operation state, the circuit through the three phase surge protection device 1 is not interrupted by the first thermal disconnect 17 or by a second thermal disconnect 18. Accordingly, a current can flow through the three phase surge protection device 1 in the operation state. In the fault state, the circuit is interrupted by at least one of the first thermal disconnect 17 and the second thermal disconnect 18. The thermal disconnects 17, 18 are configured to interrupt the circuit under fault conditions, for example overheating, to prevent the damage of the electrical equipment connected to the device.

The first thermal disconnect 17 comprises a first spring member 19. One end 19*a* of the first spring member 19 is soldered to the first terminal 10 of the stack 2 in the operation state. In particular, one end 19*a* of the first spring member 19 is connected by a low temperature solder joint 20 to the first terminal 10 in the operation state. The other end 19*b* of the first spring member 19 forms the first male connector 13 of the device 1 which is configured to be inserted into a corresponding female connector of a circuit board.

The other end 19*b* of the first spring member 19 is fixed to a mounting frame 21 of the device 1 which is arranged inside the housing 16. The mounting frame 21 will be discussed in more detail later with respect to FIGS. 7 and 8. Thus, in the operation state, both ends 19*a*, 19*b* of the first spring member 19 are fixed. Due to the fixation of both ends 19*a*, 19*b* of the first spring member 19, the first spring member 19 is deformed and thereby tensed, in the operation state of the device 1.

The first spring member 19 comprises a first abutment face 22. The first thermal disconnect 17 further comprises a first slider 23. In the operation state, the first slider 23 abuts the first abutment face 22. Thereby, the first abutment face 22 prevents a movement of the first slider 23.

The first slider 23 is a bolt. The mounting frame 21 defines a rail 24 along which the first slider 23 can move. However, in the operation state, the first abutment face 22 prevents the first slider 23 from moving along the rail 24.

Further, the first thermal disconnect 17 comprises a first spring 25. In the operation state, the first spring 25 is biased. The first spring 25 is connected to the first slider 23. The first spring 25 is arranged such that the first slider 23 is moved by the first spring 25 when the first spring 25 releases it tension. In the operation state, due to the abutment of the first slider 23 to the first abutment face 22 the first spring 25 is prevented from releasing its tension and from moving the first slider 23.

Further, the three phase surge protection device 1 comprises the above-mentioned second thermal disconnect 18. The second thermal disconnect 18 is configured to interrupt the circuit defined through the device 1 if the second varistor 4 and/or the third varistor 5 is overheated.

The second thermal disconnect 18 is constructed analogously to the first thermal disconnect 17. In particular, the second thermal disconnect 18 comprises a second spring member 26 which is soldered by a low temperature solder joint 27 to the second terminal 11 of the stack 2. The end 26*b* of the second spring member 26 that is not soldered to the second terminal 11 is fixed by the mounting frame 21. Due to the fixation of both ends 26*a*, 26*b* of the second spring member 26, the second spring member 26 is deformed and tensed. The second spring member 26 comprises a second abutment face 28 wherein a second slider 29 abuts the second abutment face 28 in the operation state. The second thermal disconnect 18 comprises a second spring 30 which is biased in the operation state of the device 1 and which is configured to move the second slider 29 when the second spring 30 releases its tension. The mounting frame 21 defines a rail 24 along which the second slider 29 can move.

Further, the device 1 comprises a micro switch 31. The micro switch 31 is configured to indicate that the circuit has been disconnected. The first slider 25 and the second slider 29 are configured to trigger the micro switch 31. As will be discussed later, when the device 1 is transferred from its operation state to its fault state, the first slider 23 and/or the second slider 29 are moved towards the micro switch 31 and trigger the micro switch 31.

Figure 4:
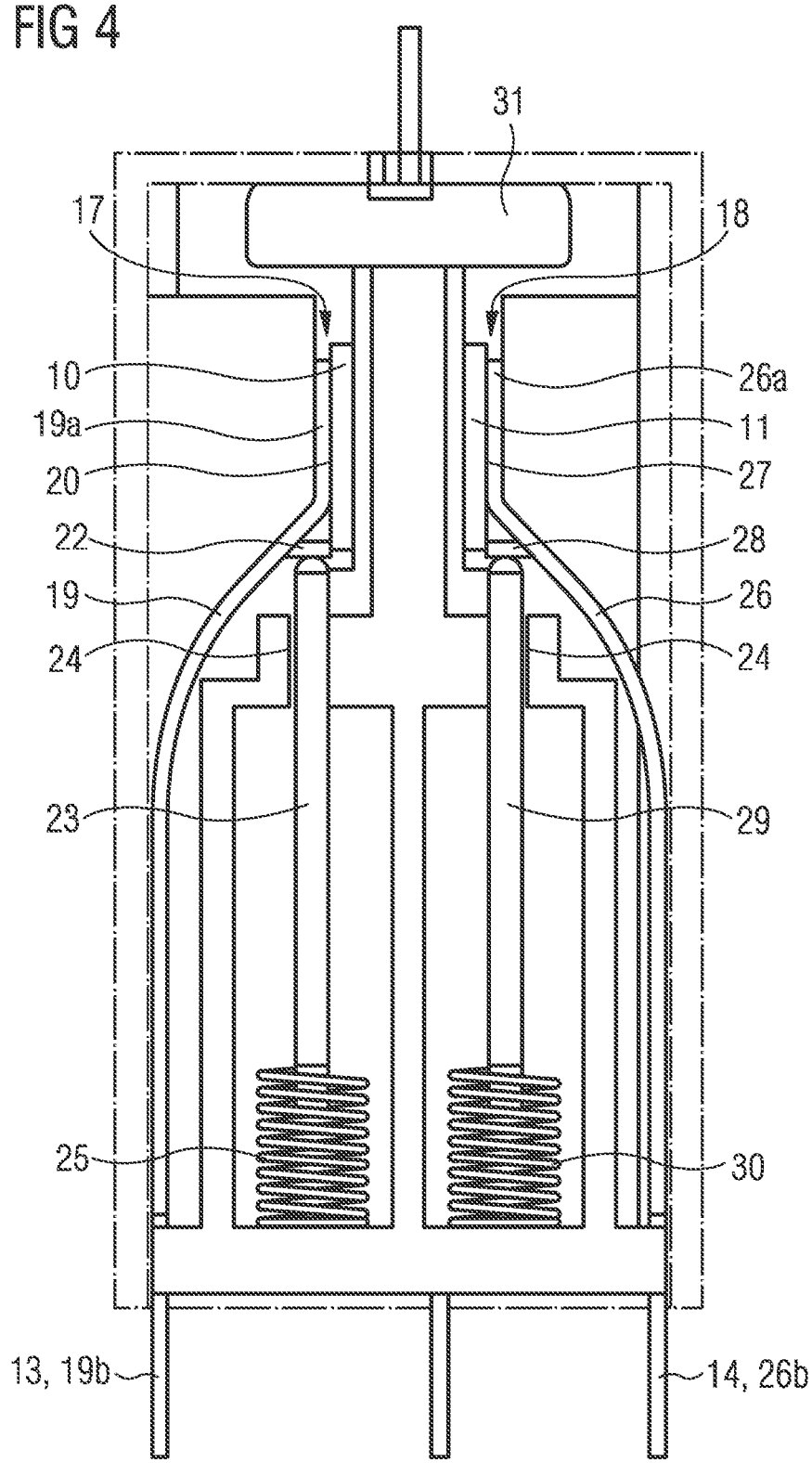
FIG. 4 shows the three phase surge protection device in its operation state in a cross-sectional view.
Figure 5:
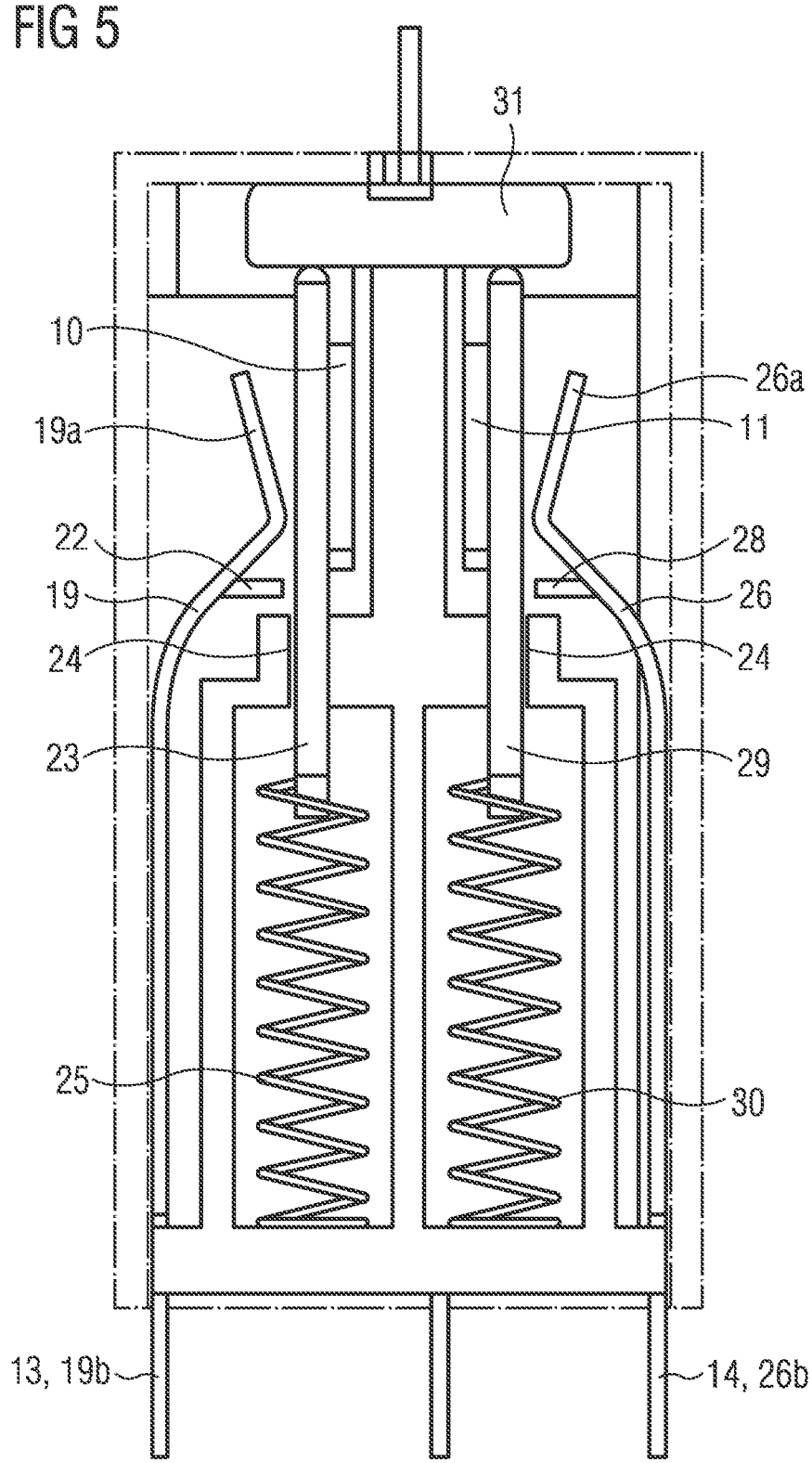
FIG. 5 shows the three phase surge protection device in its fault state in a cross-sectional view.

FIG. 4 shows the three phase surge protection device 1 in its operation state in a cross-sectional view. FIG. 5 shows the three phase surge protection device 1 in its fault state in a cross-sectional view.

In the operation state, one end 19*a* of the first spring member 19 is soldered to the first terminal 10 of the stack 2. The first spring member 19 cannot release its tension resulting from its deformation as both ends 19*a*, 19*b* of the first spring member 19 are fixed.

The first spring member 19 is shaped such that the first abutment face 22 abuts the first slider 23 when the end 19*a* of the first spring member 19 is soldered to the first terminal 10 of the stack 2. Thus, the first spring member 19 prevents a movement of the first slider 23 in the operation state.

Analogously, in the operation state, one end 26*a* of the second spring member 26 is soldered to the second terminal 11 of the stack 2. The second spring member 26 cannot release its tension resulting from its deformation as both ends 26*a*, 26*b* of the second spring member 26 are fixed. The second spring member 26 is shaped such that the second abutment face 28 abuts the second slider 29 when the end 26a of the second spring member 26 is soldered to the second terminal 11 of the stack 2. Thus, the second spring member 26 prevents a movement of the second slider 29 in the operation state.

The device 1 is transferred from its operation state to its fault state when an overheating of at least one of the varistors 3, 4, 5 occurs. In the configuration shown in FIG. 5, the third varistor 5 has been overheated. In particular, the third varistor 5 has been heated to a temperature which is higher than the melting temperatures of the low temperature solder joints 20, 27. Thus, the low temperature solder joint 20 between the first terminal 10 of the stack 2 and the first spring member 19 melts. The first spring member 19 is, therefore, enabled to release its tension. Thus, the end 19a of the first spring member 19 including the first abutment face 22 is moved away from the first terminal 10. Thereby, the first abutment face 22 no longer blocks the rail 24 along which the first slider 23 is configured to travel. Now, the first spring 25 is enabled to release its tension and to push the first slider 23 along the rail 24 and towards the micro switch 31. Thereby, the first slider 23 is moved into a position between the first terminal 10 and the end 19a of the first spring member 19. Thus, the first slider 23 prevents any electric connection by light arcs between the first terminal 10 and the first spring member 19. In particular, the first slider 23 would quench any possible arcing between the first spring member 19 and the first terminal 10.

Moreover, the low temperature solder joint 27 between the second terminal 11 of the stack 2 and the second spring member 26 also melts in response to the overheating of the third varistor 5. The second spring member 26 is, therefore, enabled to release its tension. Thus, the end 26a of the second spring member 26 including the second abutment face 28 is moved away from the second terminal 11. Thereby, the second abutment face 28 is no longer blocks the rail 24 along which the second slider 29 is configured to travel. Now, the second spring 30 is enabled to release its tension and to push the second slider 29 along the rail 24 and towards the micro switch 31. Thus, the second slider 29 is moved in a position between the second terminal 11 and the end 26a of the second spring member 26. The second slider 29 prevents any electric connection by light arcs between the second terminal 11 and the second spring member 26.

When the first slider 23 and the second slider 29 are pushed towards the micro switch 31 by the respective spring 25, 30, the sliders 23, 29 trigger the micro switch 31 such that the micro switch 31 indicates that the circuit has been disconnected.

Figure 6:
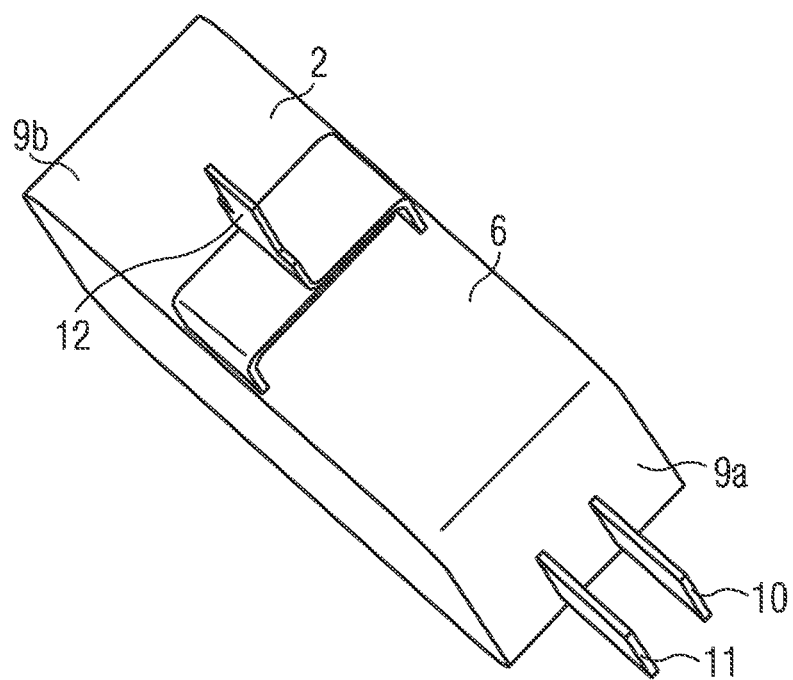
FIG. 6 shows the stack of the three varistors with a coating.

FIG. 6 shows the stack 2 of the three varistors 3, 4, 5 with the coating 6 in a perspective view.

Figure 7:
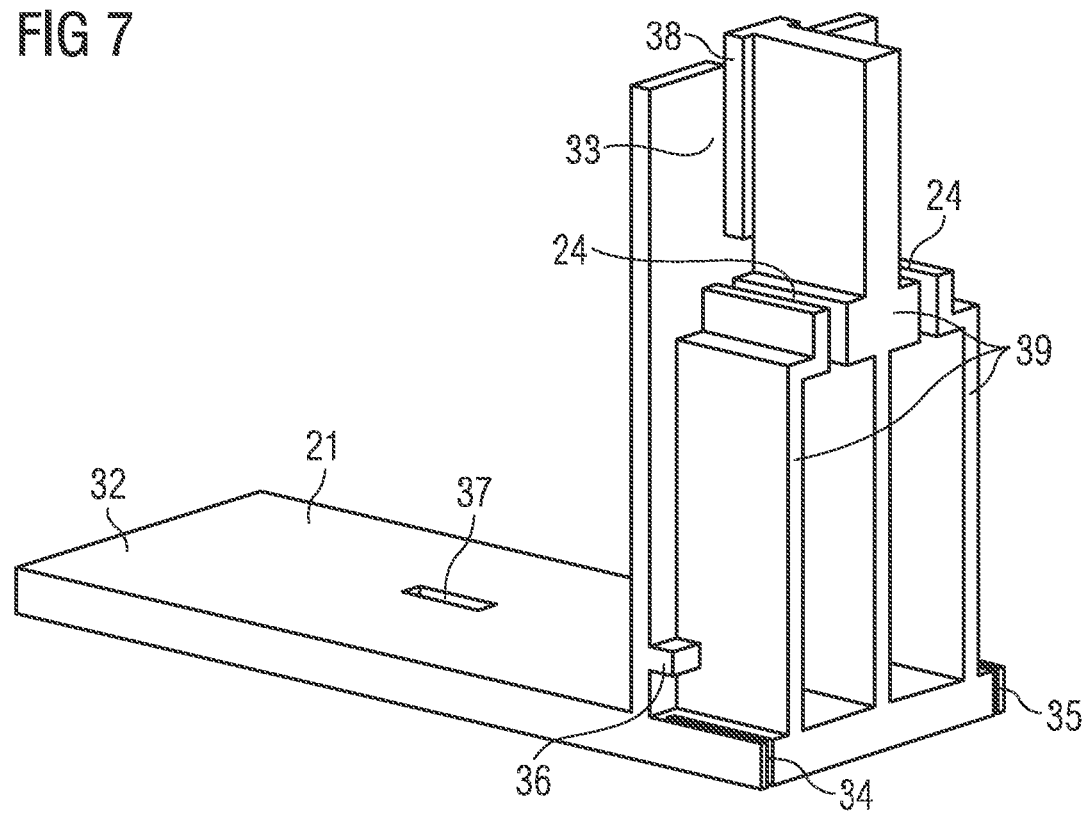
FIG. 7 shows a mounting frame.

FIG. 7 shows the mounting frame 21 of the three phase surge protection device 1. The mounting frame 21 is configured to fix the stack 2, the first thermal disconnect 17 and the second thermal disconnect 18. The mounting frame 21 is arranged inside the housing 16.

The mounting frame 21 is L-shaped and has a horizontal wall 32 and a vertical wall 33. The horizontal wall 32 is parallel to the lateral face 9b of the stack at which the third terminal 12 is arranged. The vertical wall 33 is parallel to the lateral face 9a of the stack 2 at which the first terminal 10 and the second terminal 11 are arranged.

In the horizontal wall 32 of the mounting frame 21, a first slit 34 and a second slit 35 are arranged. The first slit 34 is configured to receive the end 19b of the first spring 19 member which is not soldered to the first terminal 10. The second slit 34 is configured to receive the end 26b of the second spring member 26 which is not soldered to the second terminal 11. As one end 19b, 26b of each of the spring members 19, 26 is arranged in the first slit 34 or, respectively, in the second slit 35 and the other end 19a, 26a of the spring members 19, 26 is soldered to the first terminal 10 or, respectively, to the second terminal 11, the spring members 19, 26 are deformed and thereby tensed, in the operation state of the device 1.

The vertical wall 33 further comprises a protrusion 36 which is arranged in close proximity to the first slit 34. The protrusion 36 further helps to fix and to guide the first spring member 19. Moreover, the vertical wall 33 comprises another protrusion which is not visible in FIG. 7. The other protrusion is arranged in close proximity to the second slit 35 and helps to fix and guide the second spring member 26.

The horizontal wall 32 of the mounting frame 21 comprises a third slit 37. The third slit 37 is configured to receive the third terminal 12 of the stack 2.

The vertical wall 33 of the mounting frame 21 comprises two cut-outs 38 which are configured to receive the first terminal 10 and, respectively, the second terminal 11 of the stack 2.

The vertical wall 33 of the mounting frame 21 further comprises guiding elements 39 which define the rails 24 along which the first slider 23 and, respectively, the second slider 29 can move.

Figure 8:
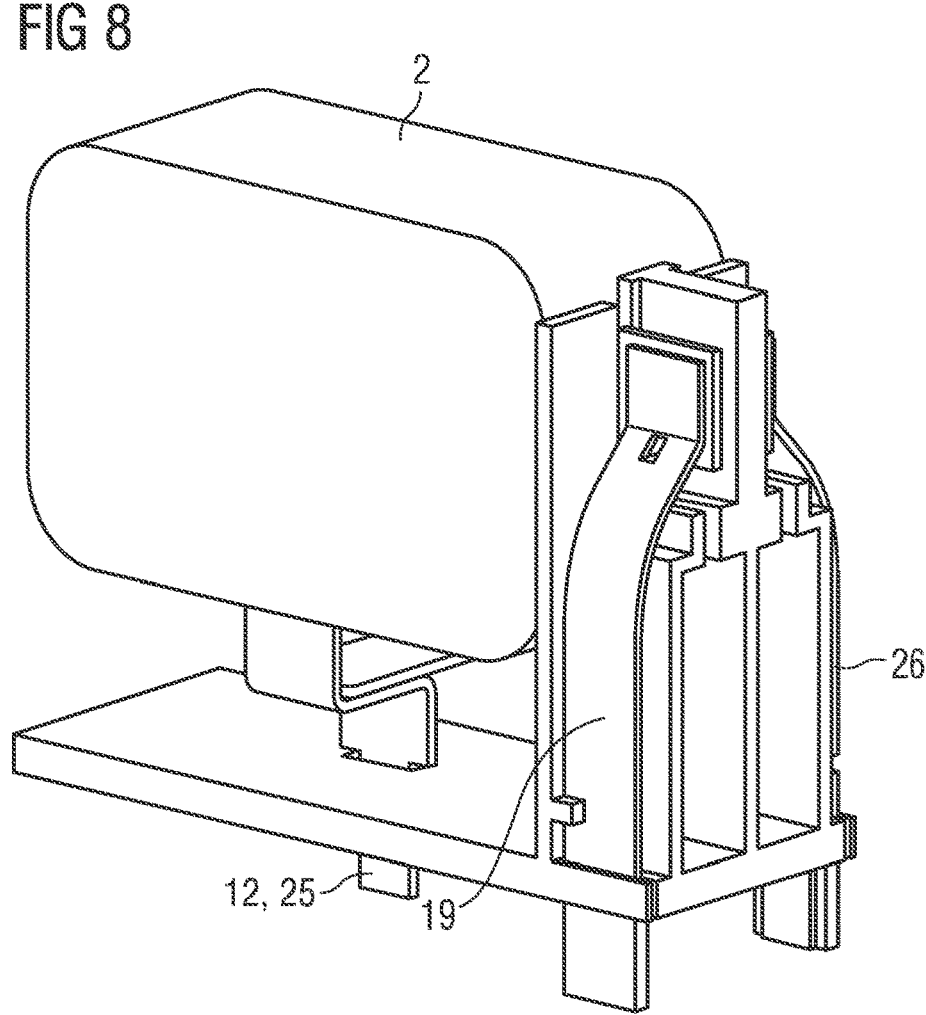
FIG. 8 shows the stack, a first spring member and a second spring member being mounted to the mounting frame.

FIG. 8 shows the stack 2, the first spring member 19 and the second spring member 26 being mounted to the mounting frame 21.

Figure 9:
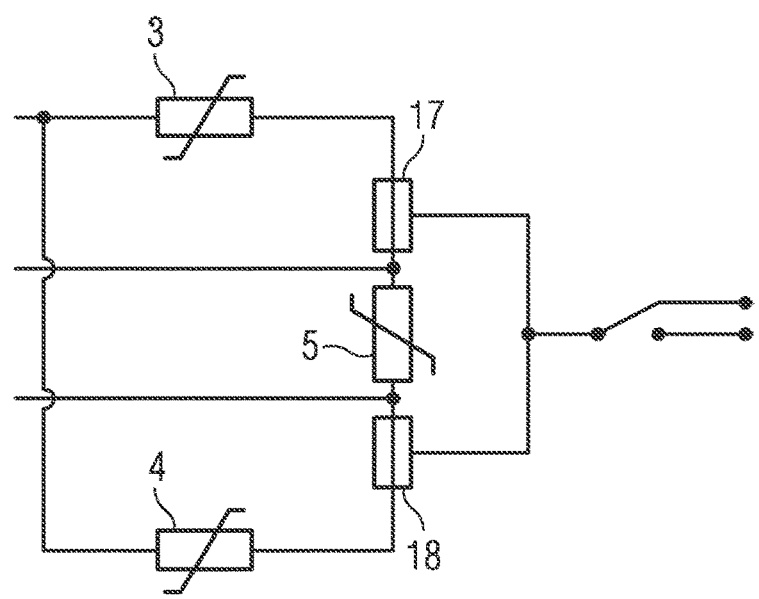
FIG. 9 shows an equivalent circuit.

FIG. 9 shows an equivalent circuit of the device 1. It can be seen in the equivalent circuit that each of the first thermal disconnect 17 and the second thermal disconnect 18 is enabled to trigger the micro switch 31 and, thereby, to interrupt the circuit.

We claim:

1. A three phase surge protection device comprising:
a stack comprising a first varistor, a second varistor and a third varistor, wherein the varistors are electrically connected to form a circuit; and
a first thermal disconnect configured to interrupt the circuit when a temperature of the first thermal disconnect exceeds a predefined temperature,
wherein the first thermal disconnect comprises a first spring member and a first slider,
wherein the first spring member is soldered to a first terminal of the stack by a low temperature solder joint,
wherein the first thermal disconnect is configured such that the first slider abuts a first abutment face of the first spring member when the first spring member is fixed to the first terminal of the stack by the low temperature solder joint such that the first slider does not apply pressure to the low temperature solder joint, and
wherein the first abutment face of the first spring member is perpendicular to the low temperature solder joint when the low temperature solder joint is closed.

2. The three phase surge protection device according to claim 1, wherein the first thermal disconnect is configured to interrupt the circuit when the low temperature solder joint melts.

3. The three phase surge protection device according to claim 1, wherein the predefined temperature is a melting temperature of the low temperature solder.

4. The three phase surge protection device according to claim 1,
wherein the first thermal disconnect is configured such that the first slider triggers a micro switch when the low temperature solder joint between the first spring member and the first terminal of the stack melts due to an overheating of at least one of the first varistor or the third varistor.

5. The three phase surge protection device according to claim 4, wherein the micro switch is configured to indicate an interruption of the circuit.

6. The three phase surge protection device according to claim 4, wherein the first thermal disconnect further comprises a first spring which is biased when the low temperature solder joint is closed and which is configured to move the first slider when the low temperature solder joint melts.

7. The three phase surge protection device according to claim 1, further comprising a second thermal disconnect configured to interrupt the circuit when a temperature of the second thermal disconnect exceeds a predefined temperature.

8. The three phase surge protection device according to claim 7, wherein the first thermal disconnect and the second thermal disconnect are independent from each other.

9. The three phase surge protection device according to claim 7, wherein the second thermal disconnect comprises a second spring member, and wherein the second spring member is soldered to a second terminal of the stack by a low temperature solder joint.

10. The three phase surge protection device according to claim 9,
wherein the second thermal disconnect comprises a second slider, and
wherein the second thermal disconnect is configured such that the second slider triggers a micro switch when the low temperature solder joint between the second spring member and the second terminal of the stack melts due to an overheating of at least one of the second varistor or the third varistor.

11. The three phase surge protection device according to claim 7, further comprising a module housing, wherein the stack, the first thermal disconnect and the second thermal disconnect are arranged inside the module housing.

12. The three phase surge protection device according to claim 7,
wherein the first terminal of the stack is connected to the first varistor and to the third varistor,
wherein a second terminal of the stack is connected to the second varistor and to the third varistor,
wherein the stack has a third terminal connected to the first varistor and to the second varistor,
wherein the first terminal of the stack is connected to one end of the first spring member by a low temperature solder joint and wherein an opposing end of the first spring member forms a first male connector of the three phase surge protection device,
wherein the second terminal of the stack is connected to one end of a second spring member by a low temperature solder joint and wherein the opposing end of the a second spring member forms a second male connector of the three phase surge protection device, and
wherein the third terminal forms a third male connector of the three phase surge protection device.

* * * * *